(12) United States Patent
Kojima et al.

(10) Patent No.: US 6,213,413 B1
(45) Date of Patent: Apr. 10, 2001

(54) FUEL INJECTION VALVE AND METHOD OF MANUFACTURING THE FUEL INJECTION VALVE

(75) Inventors: Susumu Kojima, Susono; Keiso Takeda, Mishima, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/365,237

(22) Filed: Jul. 30, 1999

(30) Foreign Application Priority Data

Sep. 14, 1998 (JP) .................................................. 10-260271

(51) Int. Cl.[7] ...................................................... F02M 61/10
(52) U.S. Cl. ................................... 239/533.11; 239/533.2; 239/533.3; 239/533.9; 239/585.1; 239/585.4; 251/64; 251/129.21; 251/332; 277/644
(58) Field of Search .............................. 239/585.1, 585.2, 239/585.3, 585.4, 533.2, 533.3, 533.4, 533.9, 533.11; 251/332, 129.21, 64; 277/612, 641, 642, 644, 648, 587

(56) References Cited

U.S. PATENT DOCUMENTS

| | | | |
|---|---|---|---|
| 2,307,440 | * | 1/1943 | Wilson ................................. 277/612 |
| 2,610,021 | * | 9/1952 | Smith ................................ 251/332 X |
| 2,959,392 | * | 11/1960 | Platen et al. ......................... 251/332 |
| 2,968,464 | * | 1/1961 | Olson .............................. 251/332 X |
| 2,995,057 | * | 8/1961 | Nenzell ............................ 251/332 X |
| 3,930,656 | * | 1/1976 | Jelinek ............................. 277/612 X |
| 4,192,520 | * | 3/1980 | Hasegawa ......................... 277/648 X |
| 4,682,759 | * | 7/1987 | Hall et al. ......................... 251/332 X |
| 4,711,400 | * | 12/1987 | Radaelli et al. ................... 239/585.4 |
| 5,116,020 | * | 5/1992 | Peng et al. ....................... 251/332 X |
| 5,372,313 | * | 12/1994 | Chabon et al. ................... 239/585.3 |

FOREIGN PATENT DOCUMENTS

| | | |
|---|---|---|
| 7-229578 | 8/1995 | (JP) . |
| 8-61152 | 3/1996 | (JP) . |

* cited by examiner

Primary Examiner—David A. Scherbel
Assistant Examiner—Robin O. Evans
(74) Attorney, Agent, or Firm—Oliff & Berridge, PLC

(57) ABSTRACT

A fuel injection valve is provided with an injection nozzle having an injection hole for fuel injection, a valve body for closing the injection hole, and an elastic body provided on one of a wall surface of the injection nozzle and a wall surface of the valve body. The elastic body is provided such that when the valve body closes the injection hole, the wall surface of the valve body comes into abutment with the wall surface of the injection nozzle after the valve body has come into abutment with the injection nozzle through the elastic body.

12 Claims, 7 Drawing Sheets

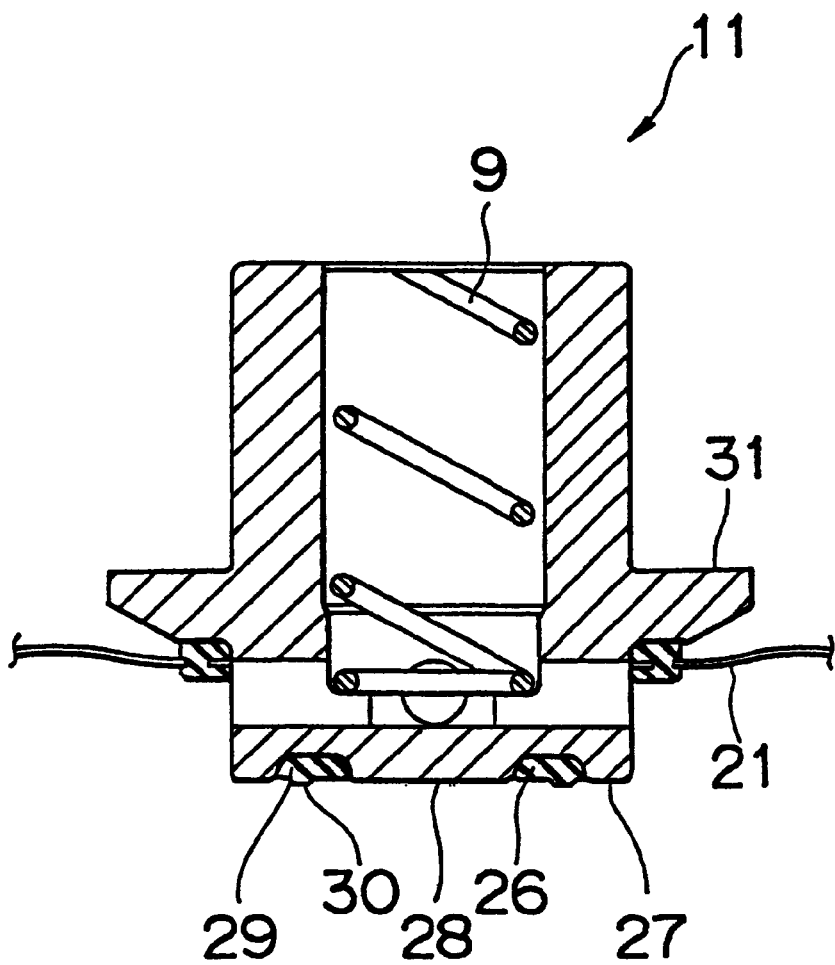

FUEL INJECTION VALVE AND METHOD OF MANUFACTURING THE FUEL INJECTION VALVE

INCORPORATION BY REFERENCE

The disclosure of Japanese Patent Application No. HEI 10-260271 filed on Sep. 14, 1998 including the specification, drawings and abstract in incorporated herein by reference in its entirety.

BACKGROUND OF THE INVENTION

1. Field of the Invention

The present invention relates to a fuel injection valve and a method of manufacturing the fuel injection valve and, more particularly, to a fuel injection valve for injecting gaseous fuel and a method of manufacturing such a fuel injection valve.

2. Description of the Related Art

Japanese Laid-Open Patent Application No. HEI 8-61152 discloses a fuel injection valve for injecting gaseous fuel. This fuel injection valve includes an injection nozzle provided with an injection hole for injecting gaseous fuel and a valve body for closing the injection hole. When a front end face of the valve body abuts on a wall surface of the injection nozzle, the valve body closes the injection hole of the injection nozzle, so that injection of gaseous fuel from the injection hole is suspended. In this fuel injection valve, an elastic body made of rubber or the like is attached to the front end face of the valve body, so as to attenuate an impact that is caused by the front end face of the valve body when it comes into abutment on the wall surface of the injection nozzle.

After gaseous fuel injection from the injection hole has been suspended, it is necessary to air-tightly shut off the injection hole. In the aforementioned fuel injection valve, the elastic body attached to the front end face of the valve body is pressed hard against the wall surface of the injection nozzle. At this time, there is a possibility that the elastic body is excessively pressed against the wall surface of the injection nozzle. In this case, the elastic body deteriorates in quality at an early stage.

SUMMARY OF THE INVENTION

It is an object of the present invention to prevent the elastic body attached to the valve body from deteriorating in quality at an early stage, while keeping the injection hole securely closed by the valve body in an air-tight manner.

In a first aspect of the present invention, there is provided a fuel injection valve including an injection nozzle provided with an injection hole for fuel injection, a valve body for closing the injection hole, and an elastic body provided either on a wall surface of the injection nozzle or on a wall surface of the valve body. In this fuel injection valve, the elastic body is provided such that when the valve body closes the injection hole, the wall surface of the valve body comes into abutment on the wall surface of the injection nozzle after the valve body has come into abutment on the injection nozzle through the elastic body.

According to the aforementioned first aspect, after the valve body has come into abutment on the injection nozzle through the elastic body, the wall surface of the valve body comes into abutment on the wall surface of the injection nozzle. Therefore, the elastic body attenuates an impact that is caused when the wall surface of the valve body comes into abutment on the wall surface of the injection nozzle. Consequently, the valve body is prevented from deteriorating in quality at an early stage. Furthermore, since the wall surface of the valve body abuts on the wall surface of the injection nozzle, the elastic body is not deformed beyond a predetermined degree. In other words, there is no possibility of the elastic body being deformed excessively. Accordingly, the elastic body is prevented from deteriorating in quality at an early stage.

In the aforementioned first aspect, a sum of maximal surface roughness values of the wall surface of the valve body and the wall surface of the injection nozzle, which abut on each other, may be substantially equal to or smaller than 4 $\mu$m. Furthermore, a maximal surface roughness value of each of the wall surfaces of the valve body and the injection nozzle, which abut on each other, may be substantially equal to or smaller than 2 $\mu$m.

In the aforementioned first aspect, the elastic body may be provided with a protruding portion that protrudes toward the other of the wall surface of the injection nozzle and the wall surface of the valve body.

Further, the elastic body may have an annular shape, and the protruding portion may be provided radially inwardly of a radially central portion of the elastic body.

Further, the elastic body may have an annular shape, and the elastic body may have a face that is located radially outwardly of the protruding portion and is recessed in such a direction as to move away from the other of the wall surface of the injection nozzle and the wall surface of the valve body.

Further, the elastic body may have an annular shape and may be disposed in an annular recess portion provided in one of the wall surface of the injection nozzle and the wall surface of the valve body. The elastic body may have an outer peripheral surface that is smaller in outer diameter than the annular recess portion.

Further, the elastic body may have an annular shape and may be disposed in an annular recess portion provided in one of the wall surface of the injection nozzle and the wall surface of the valve body. The recess portion may have a bottom face that is inclined such that the recess portion becomes shallower inwards in a radial direction of the injection nozzle or the valve body.

Further, the other of the wall surface of the injection nozzle and the wall surface of the valve body, on which the elastic body abuts, may be inclined in such a manner as to approach one of the injection nozzle and the valve body inwards in a radial direction of the injection nozzle or the valve body.

Further, the elastic body may have an annular shape and may be disposed in an annular recess portion provided in one of the wall surface of the injection nozzle and the wall surface of the valve body. The elastic body may have an inner peripheral face that is greater in inner diameter than the annular recess portion.

In the aforementioned aspect, gaseous fuel may be used.

In a second aspect of the present invention, there is provided a method of manufacturing a fuel injection valve that includes an injection nozzle provided with an injection hole for fuel injection, a valve body for closing the injection hole, and an elastic body provided either on a wall surface of the injection nozzle or on a wall surface of the valve body, wherein the elastic body is provided such that when the valve body closes the injection hole, the wall surface of the valve body comes into abutment with the wall surface of the injection nozzle after the valve body has come into abutment with the injection nozzle through the elastic body. This method includes the step of causing the wall surface of the valve body and the wall surface of the injection nozzle, which abut each other, to slidably contact each other so as to reduce a maximal surface roughness value of the wall surfaces that abut each other.

According to the second aspect, the wall surface of the valve body and the wall surface of the injection nozzle, which abut each other, are caused to slidably contact each other, so as to reduce a maximal surface roughness value of the wall surfaces abutting each other. Therefore, a high degree of sealability is obtained between the wall surface of the valve body and the wall surface of the injection nozzle.

BRIEF DESCRIPTION OF THE DRAWINGS

The foregoing and further objects, features and advantages of the present invention will become apparent from the following description of preferred embodiments with reference to the accompanying drawings, wherein:

FIG. 2 is a sectional view of a valve body of the first embodiment;

DETAILED DESCRIPTION OF THE PREFERRED EMBODIMENTS

Figure 1:
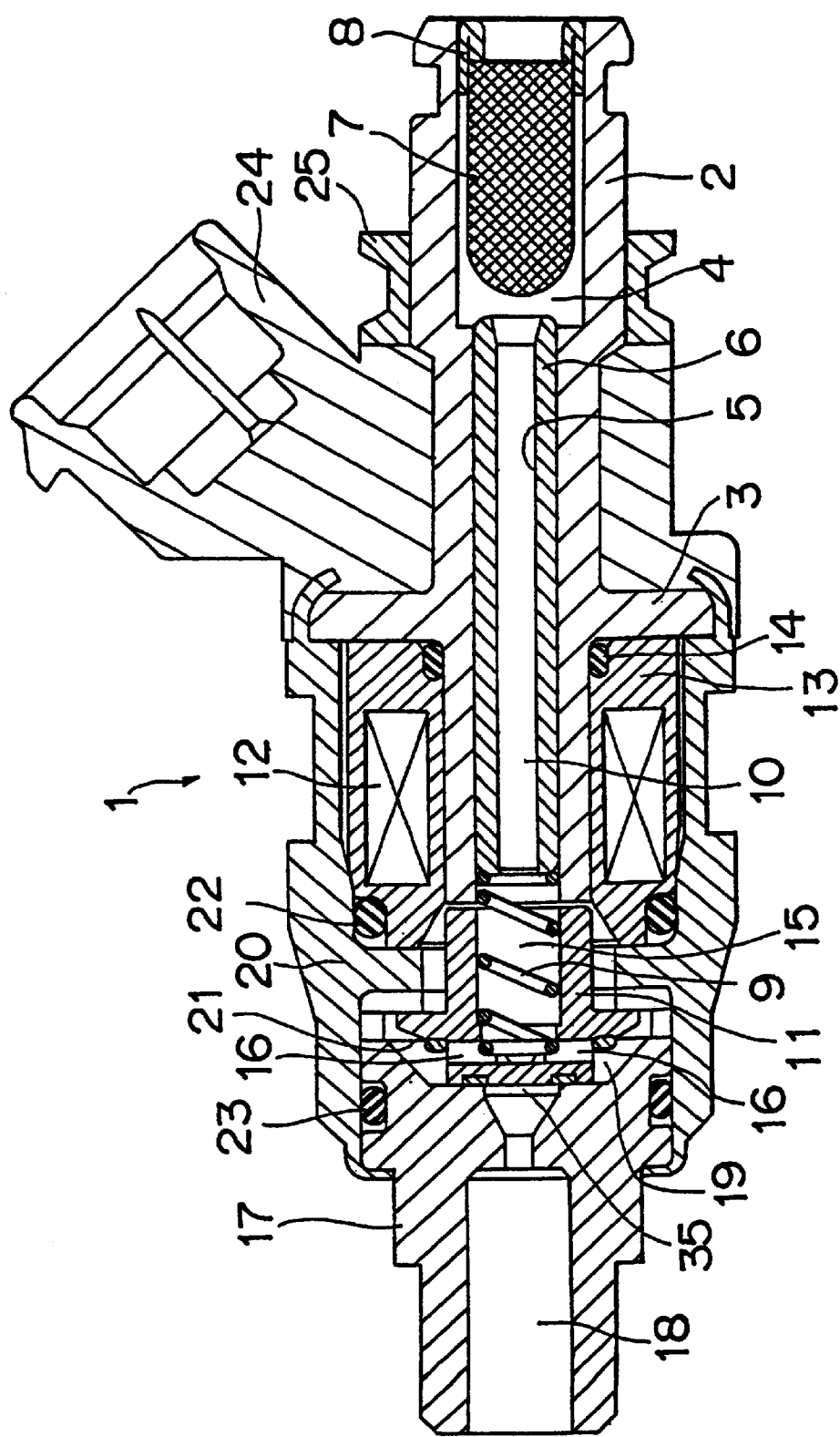
FIG. 1 is a sectional view of a fuel injection valve according to a first embodiment of the present invention.

The present invention will be described hereinafter in detail with reference to the accompany drawings. FIG. 1 shows a fuel injection valve according to a first embodiment of the present invention. A fuel injection valve 1 is provided with a body 2 that extends in an axial direction thereof. The body 2 has a generally cylindrical shape, and a flange 3 protrudes radially outwardly of the fuel injection valve 1 from an outer peripheral face of the body 2. A first space 4, which extends in the axial direction of the fuel injection valve 1 and has a generally cylindrical shape, is formed in the body 2 on an upstream side. A second space 5, which is smaller in diameter than the first space 4 and has a generally cylindrical shape, is formed in the body 2 on a downstream side. The first space 4 serves as fuel passage for transporting gaseous fuel, and the second space 5 serves as an accommodation space for accommodating a later-described tubular member 6. In the present specification, the terms "upstream" and "downstream" are used in conjunction with a direction in which fuel flows in the fuel injection valve. Provided that fuel flows from the upstream side to the downstream side in the fuel injection valve shown in FIG. 1, the fuel flows in the right-to-left direction in FIG. 1.

A filter 7 for filtering gaseous fuel passing through the first space 4 is fixed in the first space 4 by means of a fixture 8. The tubular member 6 for holding a later-described coil spring 9 is inserted into the second space 5. A third space 10 that extends in the axial direction of the fuel injection valve 1 is formed in the tubular member 6. The third space 10 serves as a fuel passage for transporting gaseous fuel.

A front end portion of the body 2 is accommodated in an annular member 13 that is provided with an electromagnetic coil 12 for driving a metal valve body 11, which will be described later in detail. In the present specification, the term "front end" indicates a downstream portion of a corresponding member, whereas the term "rear end" indicates an upstream portion of the member. An O-ring 14 air-tightly seals a gap between the tubular member 6 and the annular member 13. Furthermore, valve body 11, which has a generally cylindrical shape, is disposed downstream of the body 2 such that the valve body 11 is aligned with the body 2 in the axial direction of the fuel injection valve 1. A front end face of the body 2 and a rear end face of the valve body 11 are opposed to each other with a slight gap formed therebetween. A fourth space 15 that extends in the axial direction of the fuel injection valve 1 is formed in the valve body 11. The fourth space 15 serves as a fuel passage for transporting gaseous fuel. Four branch fuel passages 16, which extend in the radial direction of the fuel injection valve 1, are formed at the front end portion of the valve body 11. The branch fuel passages 16 are provided at equal intervals in a circumferential direction of the valve body. The branch fuel passages 16 communicate with the fourth space 15 in the valve body 11. Furthermore, the coil spring 9 is accommodated in the fourth space 15 in the valve body 11. The coil spring 9 extends between the front end face of the tubular member 6 and an inner face of the front end portion of the valve body 11. The coil spring 9 urges the valve body 11 such that the valve body 11 leaves the body 2 and approaches a metal injection nozzle 17. The injection nozzle 17 will be described later in detail.

The injection nozzle 17, which has a generally cylindrical shape, is disposed downstream of the valve body 11 such that the injection nozzle 17 is aligned with the valve body 11 in the axial direction of the fuel injection valve 1. A front end face of the valve body 11 and a rear end face of the injection nozzle 17 are opposed to each other with a slight gap formed therebetween. An injection hole 35 is formed in the rear end face of the injection nozzle 17. Following the injection hole 35, a fifth space 18 that extends in the axial direction of the fuel injection valve 1 is formed in the injection nozzle 17. The fifth space 18 serves as a fuel passage for transporting gaseous fuel and injecting the gaseous fuel from the fuel injection valve. A rear end portion of the injection nozzle 17 surrounds the front end portion of the valve body 11, and a fuel storage space 19 is formed between an outer peripheral face of the front end portion of the valve body 11 and an inner peripheral face of the rear end portion of the injection nozzle 17. Thus, after sequentially flowing through the first space 4, the third space 10, the fourth space 15 and the branch fuel passage 16, gaseous fuel is stored in the fuel storage space 19.

A housing 20 surrounds the body 2 of the fuel injection valve 1, the annular member 13, the valve body 11 and the injection nozzle 17. The valve body 11 is supported by the housing 20 through an elastic plate 21. Because the elastic plate 21 has elasticity, it movably supports the valve body 11 within the housing 20. O-rings 22 and 23 air-tightly seal a gap between the housing 20 and the annular member 13 and a gap between the housing 20 and the injection nozzle 17 respectively. An electric connector 24, which serves to connect to a source of electricity for driving the electromagnetic coil 12, is mounted around the body 2. The electric connector 24 is fixed to the body 2 by means of a fixture 25.

The construction of the valve body of the first embodiment will now be described in detail. As shown in FIG. 2, an annular recess portion 26, whose center is located on the axis of the valve body 11, is formed in a front end face of the valve body 11. The front end face is made up of an outer peripheral front end face 27, which is located outwardly of the recess portion 26 in the radial direction of the valve body 11 and a central front end face 28, which is located inwardly of the recess portion 26 in the radial direction of the valve body 11. The outer peripheral front end face 27 protrudes in the axial direction of the valve body 11 further than the central front end face 28. An annular elastic body 29 made of rubber or the like is inserted into the recess portion 26. An annular protruding portion 30 is formed on a front end face of the elastic body 29. The protruding portion 30 protrudes in the axial direction of the valve body 11 beyond the outer peripheral front end face 27 of the valve body 11. In the radial direction of the elastic body 29, the protruding portion 30 is formed outwardly of a central portion of the elastic body 29. Furthermore, in the axial direction of the elastic body 29, the protruding portion 30 has a generally semicircular cross section. The front end face of the elastic body 29 other than the protruding portion 30 is recessed axially inwardly with respect to the central front end face 28 of the valve body 11. Furthermore, the valve body 11 is provided with a flange 31, which extends radially outwardly from the outer peripheral face of the valve body 11. A front end face of the flange 31 abuts on the aforementioned elastic plate 21. Thus, the valve body 11 is supported by the elastic plate 21.

A method of manufacturing the outer peripheral front end face of the first embodiment will now be described. In the first embodiment, after the valve body 11 has been manufactured, the valve body 11 is rotated relative to the injection nozzle 17 with the outer peripheral front end face 27 abutting the rear end face of the injection nozzle 17. Thereby, the outer peripheral front end face 27 and the rear end face of the injection nozzle 17 are abraded by each other. Hence, in the first embodiment, when the outer peripheral front end face 27 abuts the rear end face of the injection nozzle 17, the sealability between the valve body 11 and the injection nozzle 17 is enhanced. It is preferable that the maximal surface roughness value of the outer peripheral front end face of the valve body and the maximal surface roughness value of the rear end face of the injection nozzle have a combined sum that is substantially equal to or less than 4 $\mu$m. More preferably, each of the maximal surface roughness values is substantially equal to or less than 2 $\mu$m. The maximal surface roughness value is the difference between the highest point and the lowest point on the surface.

Figure 3A:
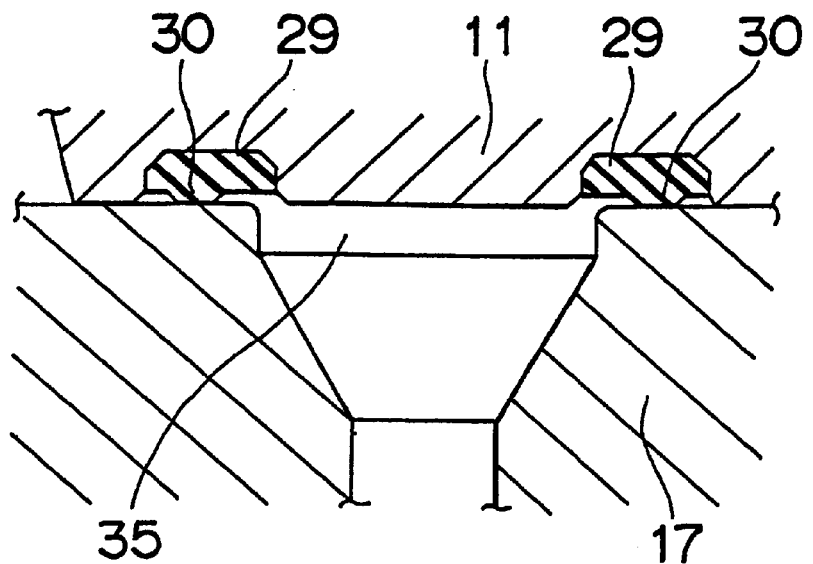
FIG. 3A shows a state where the valve body abuts on an injection nozzle.
Figure 3B:
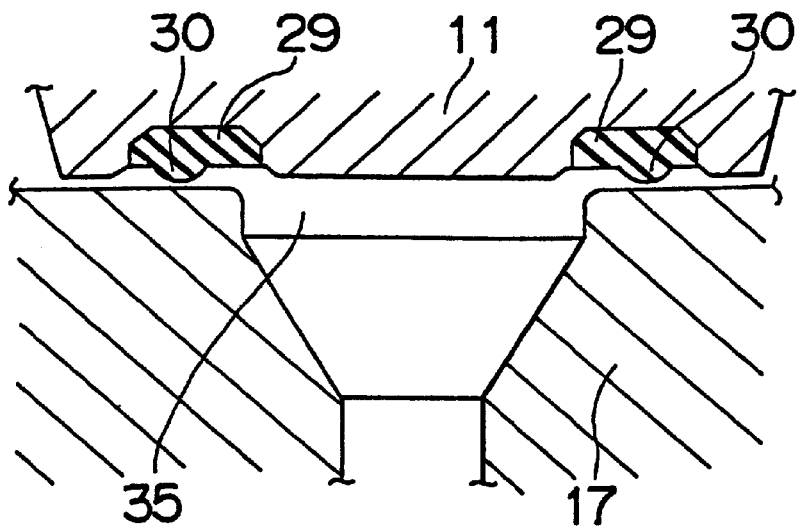
FIG. 3B shows a state where the valve body is spaced apart from the injection nozzle.

The operation of the fuel injection valve and the function of the valve body will now be described. When the electromagnetic coil 12 is not being driven, the urging force of the coil spring 9 is greater than that of the elastic plate 21. Therefore, as shown in FIG. 3A, the outer peripheral front end face 27 and the protruding portion 30 of the elastic body 29 abut on the rear end face of the injection nozzle 17. At this time, the elastic plate 21 urges the valve body 11 such that the valve body 11 approaches the body 2 and moves away from the injection nozzle 17. On the other hand, if the electromagnetic coil is driven, the valve body 11 is caused to move away from the injection nozzle 17 against an urging force of the coil spring 9. Then as shown in FIG. 3B, the outer peripheral front end face 27 of the valve body 11 and the protruding portion 30 of the elastic body 29 separate from the rear end face of the injection nozzle 17. At this time, a passage is formed between the valve body 11 and the injection nozzle 17. Fuel in the fuel storage space 19 flows into the injection nozzle 17 through the passage and is then injected from the injection nozzle 17. If the electromagnetic coil 12 is stopped from being driven after fuel injection, the valve body 11 is caused to move toward the injection nozzle 17 by an urging force of the coil spring 9. When the valve body 11 starts moving, the protruding portion 30 of the elastic body 29 first comes into abutment on the rear end face of the injection nozzle 17. After the protruding portion 30 of the elastic body 29 has been deformed to a predetermined degree, the outer peripheral front end face 27 of the valve body 11 comes into abutment on the rear end face of the injection nozzle 17. The valve body 11 is then stopped from moving. In this manner, the passage formed between the valve body 11 and the injection nozzle 17 is shut off.

Thus, in the first embodiment, before the outer peripheral front end face 27 of the valve body 11 comes into abutment on the rear end face of the injection nozzle 17, the protruding portion 30 of the elastic body 29 comes into abutment on the rear end face of the injection nozzle 17. As a result, the impact caused by the outer peripheral front end face 27 of the valve body 11 at the time of abutment on the injection nozzle 17 is attenuated. Therefore, the first embodiment makes it possible to prevent the valve body from deteriorating in quality at an early stage.

In the first embodiment, when the protruding portion 30 of the elastic body 29 is deformed to a predetermined extent after having come into abutment on the rear end face of the injection nozzle, the outer peripheral front end face 27 of the valve body 11 abuts on the rear end face of the injection nozzle 17. That is, when the valve body 11 abuts on the injection nozzle 17, the deformation amount of the elastic body 29 is limited to a predetermined level by the outer peripheral front end face of the valve body 11. In the first embodiment, the elastic body is not deformed beyond a necessary level. Accordingly, the first embodiment prevents the elastic body from deteriorating in quality at an early stage.

In the first embodiment, even if the sealability between the rubber elastic body and the injection nozzle has deteriorated due to the hardening of the elastic body at an extremely low temperature, the sealability between the valve body and the injection nozzle does not deteriorate. This is because the valve body is made of a metal. Hence, the first embodiment makes it possible to prevent fuel from leaking out from a gap between the valve body and the injection nozzle regardless of the temperature the fuel injection valve is subjected to.

In the first embodiment, even if the elastic body is excessively pressed against the rear end face of the injection nozzle, there is a space between the elastic body and the rear end face of the injection nozzle. Therefore, the elastic body can escape into the space. Consequently, the elastic body is prevented from deteriorating in quality at an early stage.

In the first embodiment, the deformation amount of the elastic body is kept lower than the predetermined level, and the elastic body attenuates an impact caused by the valve body at the time of abutment on the rear end face of the injection nozzle. The elastic body and the valve body are not seriously abraded. Accordingly, when the valve is moved so as to open the injection hole of the injection nozzle, the moving stroke of the valve body is maintained at a predetermined level. Therefore, the first embodiment makes it possible to inject a precise amount of gaseous fuel from the fuel injection valve.

Figure 4A:
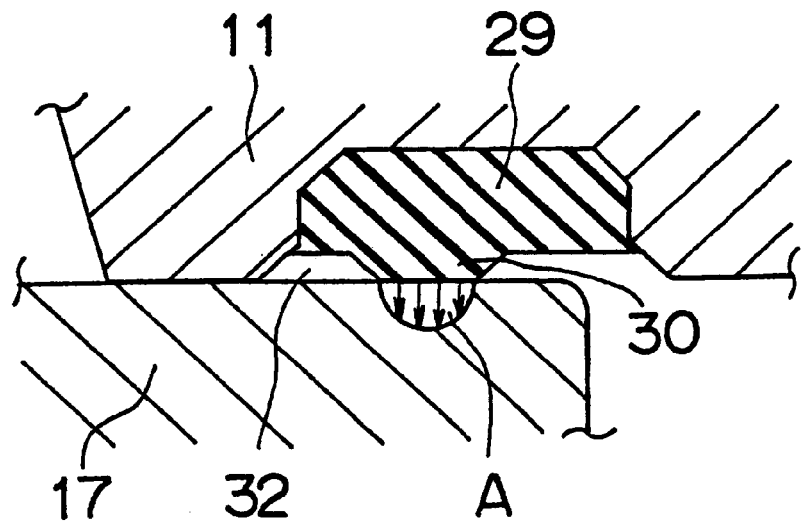
FIG. 4A shows the valve body and the injection nozzle when there is no fuel leaking out from a gap therebetween.
Figure 4B:
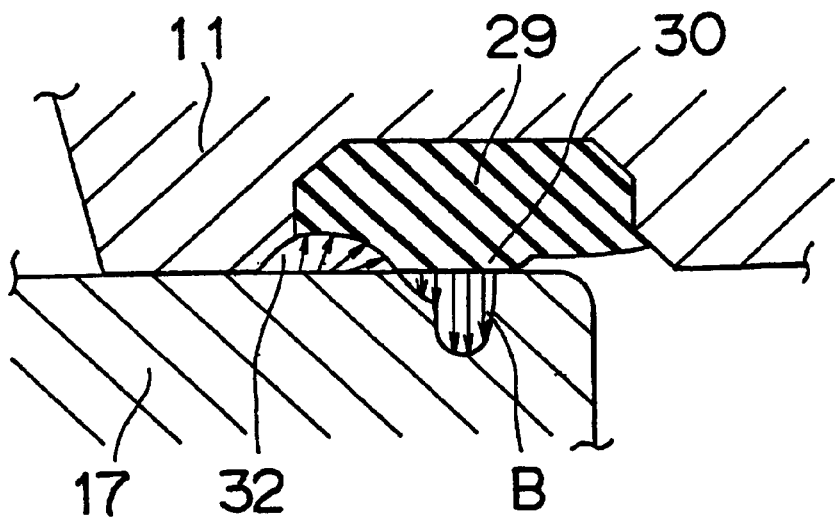
FIG. 4B shows the valve body and the injection nozzle when fuel leaks out from a gap therebetween.

It will now be described how the elastic body operates when the valve body abuts on the injection nozzle. In the case where no fuel leaks out from a gap between the outer peripheral front end face 27 of the valve body 11 and the rear end face of the injection nozzle 17, the protruding portion 30 of the elastic body 29, which has been deformed by the rear end face of the injection nozzle 17 as shown in FIG. 4A, air-tightly seals the gap between the elastic body 29 and the rear end face of the injection nozzle 17. At this time, the force applied to the rear end face of the injection nozzle 17 by the protruding portion 30 of the elastic body 29 is distributed in a range A shown in FIG. 4A. Conversely, if fuel leaks out from a gap between the outer peripheral front end face 27 of the valve body 11 and the rear end face of the injection nozzle 17, the gaseous fuel flows into a space 32 that is defined by the valve body 11, the elastic body 29 and the injection nozzle 17. At this time, the pressure of the gaseous fuel (hereinafter, referred to as the fuel pressure) presses the elastic body 29 in the axial direction of the valve body 11, so that the elastic body 29 is deformed as shown in FIG. 4B. At this time, the force applied to the rear end face of the injection nozzle 17 by the protruding portion 30 of the elastic body 29 is distributed in a range B shown in FIG. 4B. The deformation causes the protruding portion 30 of the elastic body 29 to be pressed further against the rear end face of the injection nozzle 17. Therefore, the sealing force between the elastic body 29 and the rear end face of the injection nozzle 17 increases. Thus, according to the first embodiment, even if fuel leaks out from the gap between the outer peripheral front end face 27 and the rear end face of the injection nozzle 17, it is possible to securely shut off the passage formed between the valve body 11 and the injection nozzle 17. Further, in the first embodiment, the deformation amount of the elastic body 29 is made greater than the aforementioned predetermined level only if fuel has leaked out from the gap between the valve body 11 and the injection nozzle 17. Consequently, the first embodiment makes it possible to prevent the elastic body 29 from deteriorating in quality at an early stage.

Figure 5:
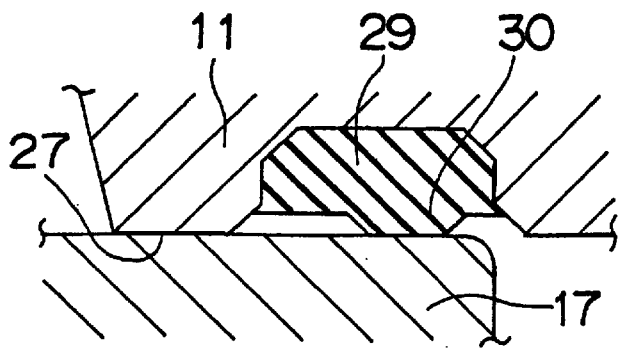
FIG. 5 is a sectional view of the elastic body according to a second embodiment of the present invention.

A fuel injection valve according to a second embodiment of the present invention will now be described. Except for the valve body, the fuel injection valve of the second embodiment has the same construction and function as that of the first embodiment, and therefore will not be described below. In the first embodiment, in the case where gaseous fuel has leaked out from the gap between the outer peripheral front end face 27 of the valve body 11 and the rear end face of the injection nozzle 17, the thus-leaked gaseous fuel deforms the elastic body 29, whereby the sealability between the protruding portion 30 of the elastic body 29 and the rear end face of the injection nozzle 17 is increased. However, if the sealability has been increased too much, it needs to be reduced. That is, in the second embodiment shown in FIG. 5, the protruding portion 30 of the elastic body 29 is provided radially further inwardly of the central portion of the elastic body 29, in comparison with the protruding portion 30 of the elastic body 29 of the first embodiment. By thus reducing the size of the portion of the elastic body 29 that is radially inwardly of the protruding portion 30, the volume of the elastic body 29 deformed by the leaked gaseous fuel is reduced. Therefore, in comparison with the first embodiment, the second embodiment achieves a less remarkable increase in sealability.

Figure 6:
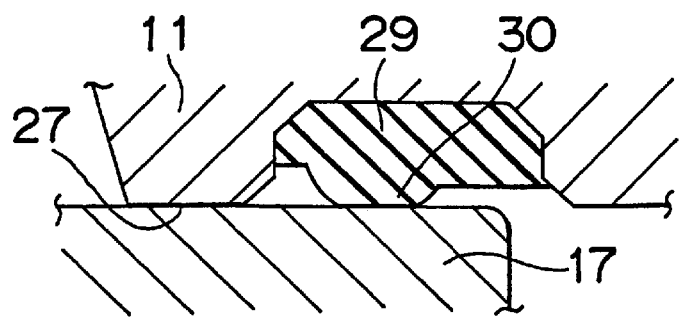
FIG. 6 is a sectional view of the elastic body according to a third embodiment of the present invention.

A fuel injection valve according to a third embodiment of the present invention will now be described. Except for the valve body, the fuel injection valve of the third embodiment has the same construction and function as that of the first embodiment, and therefore will not be described below. In the first embodiment, in the case where fuel has leaked out from the gap between the outer peripheral front end face 27 of the valve body 11 and the rear end face of the injection nozzle 17, the thus-leaked gaseous fuel deforms the elastic body 29, whereby the sealability between the protruding portion 30 of the elastic body 29 and the rear end face of the injection nozzle 17 is increased. However, if the sealability has been increased insufficiently, it needs to be further increased. That is, in the third embodiment shown in FIG. 6, the front end face of the elastic body 29 located radially outwardly of the protruding portion 30 thereof is further recessed inwards in the axial direction, in comparison with the first embodiment. By thus recessing the front end face of the elastic body 29, the surface area of the protruding portion 30 of the elastic body 29 to which the leaked fuel applies a pressure increases. Therefore, in comparison with the first embodiment, the deformation amount of the protruding portion 30 of the elastic body 29 increases. Therefore, in comparison with the first embodiment, the third embodiment achieves a considerable increase in sealability.

Figure 7:
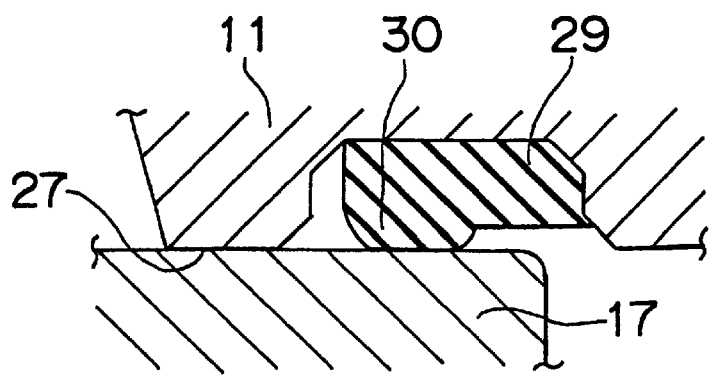
FIG. 7 is a sectional view of the elastic body according to a fourth embodiment of the present invention.

A fuel injection valve according to a fourth embodiment of the present invention will now be described. Except for the valve body, the fuel injection valve of the fourth embodiment has the same construction and function as that of the first embodiment, and therefore will not be described below. The third embodiment achieves a considerable increase in sealability than the first embodiment. However, there is a case where the thus-increased sealability needs to be further increased. That is, in the fourth embodiment shown in FIG. 7, the diameter of the outer peripheral face of the elastic body 29 is reduced in comparison with the first embodiment. By thus reducing the size of the outer peripheral face of the elastic body 29 radially inwardly of the valve body 11, the surface area of the elastic body 29 to which the fuel applies a pressure so as to deform the elastic body 29 inwards in the radial direction of the valve body 11 increases. Therefore, in comparison with the third embodiment, the deformation amount of the protruding portion 30 of the elastic body 29 increases. Therefore, in comparison with the third embodiment, the fourth embodiment achieves a considerable increase in sealability.

Figure 8:
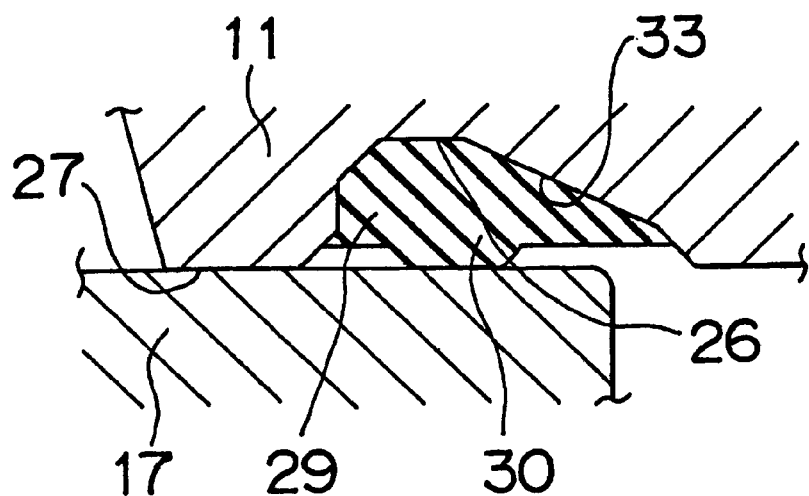
FIG. 8 is a sectional view of the elastic body according to a fifth embodiment of the present invention.

A fuel injection valve according to a fifth embodiment of the present invention will now be described. Except for the valve body, the fuel injection valve of the fifth embodiment has the same construction and function as that of the first embodiment, and therefore will not be described below. In the fifth embodiment shown in FIG. 8, a bottom face 33 of the recess portion 26 is inclined such that the recess portion 26 of the valve body 11 becomes shallower inwards in the radial direction of the valve body 11. Therefore, a fuel pressure acts on the protruding portion 30 of the elastic body 29. When the protruding portion 30 of the elastic body 29 is deformed radially inwardly of the valve body 11, the fuel pressure acting on the elastic body 29 radially inwards is converted into a fuel pressure acting on the injection nozzle 17 axially outwardly of the valve body 11, by the bottom face 33 of the recess portion 26. Therefore, in comparison with the first embodiment, the fifth embodiment achieves a considerable increase in sealability.

Figure 9:
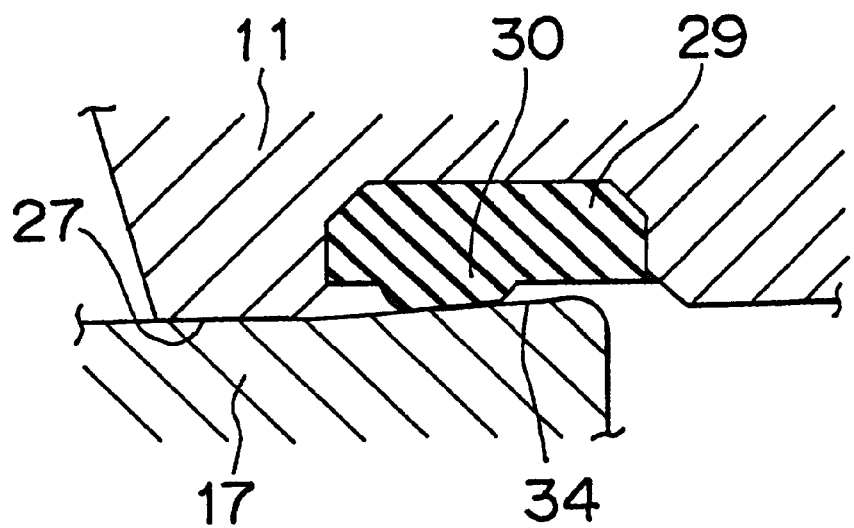
FIG. 9 is a sectional view of the elastic body according to a sixth embodiment of the present invention.

A fuel injection valve according to a sixth embodiment of the present invention will now be described. Except for the valve body, the fuel injection valve of the sixth embodiment has the same construction and function as that of the first embodiment, and therefore will not be described below. In the sixth embodiment shown in FIG. 9, the protruding portion 30 of the elastic body 29 is inclined such that a rear end face 34 of the injection nozzle 17 on which the protruding portion 30 of the elastic body 29 abuts approaches the valve body 11 inwards in the radial direction of the injection nozzle 17. Therefore, a fuel pressure acts on the protruding portion 30 of the elastic body 29. When the protruding portion 30 of the elastic body 29 is deformed radially inwardly of the valve body 11, the fuel pressure that is applied to the elastic body 29 radially inwards acts on the inclined rear end face 34 of the injection nozzle 17. The fuel pressure acting on the inclined rear end face 34 of the injection nozzle 17 is converted into a counterforce acting inwards in the axial direction of the valve body 11. Hence, the protruding portion 30 of the elastic body 29 is further pressed against the rear end face 34 of the injection nozzle 17. Therefore, in comparison with the first embodiment, the sixth embodiment achieves a considerable increase in sealability.

Figure 10A:
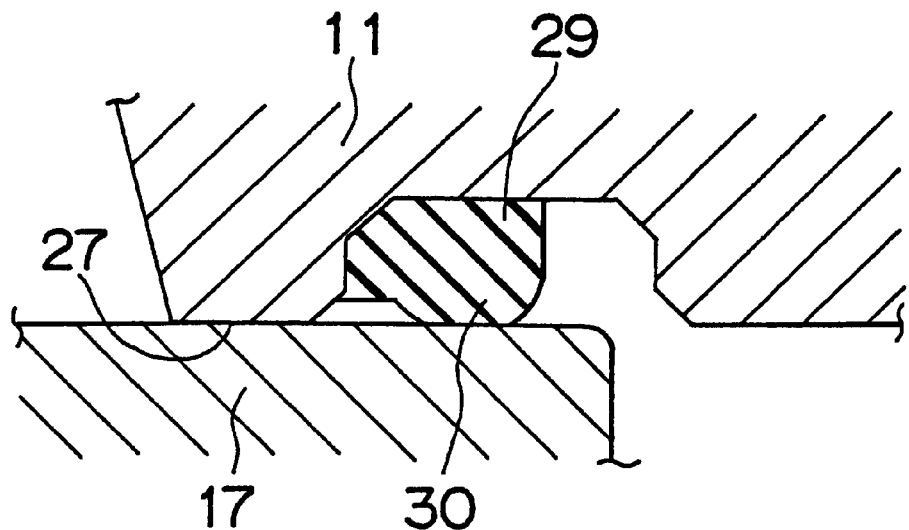
FIG. 10A is a sectional view of the elastic body according to a seventh embodiment of the present invention prior to movement thereof.
Figure 10B:
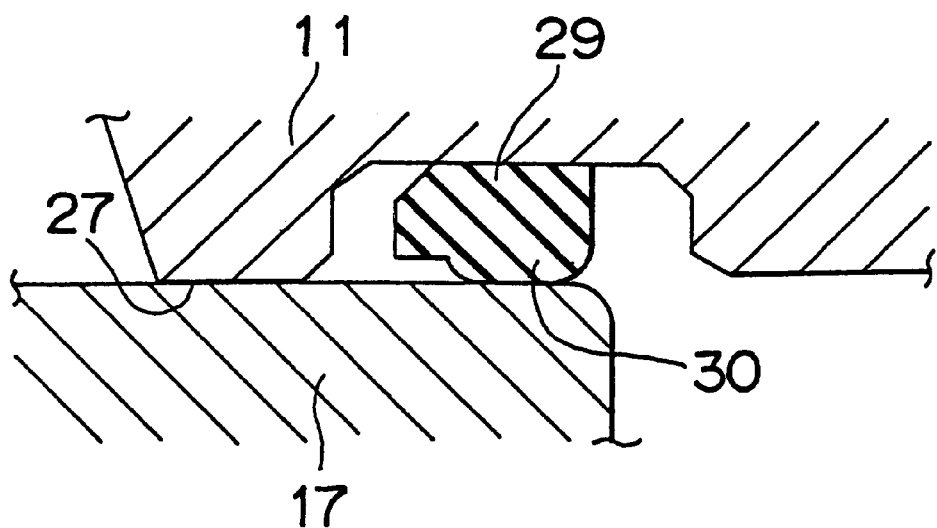
FIG. 10B is a sectional view of the elastic body of the seventh embodiment after movement thereof.

A fuel injection valve according to a seventh embodiment of the present invention will now be described. Except for the valve body, the fuel injection valve of the seventh embodiment has the same construction and function as that of the first embodiment, and therefore will not be described below. In the first embodiment, when the fuel pressure in the fuel storage space is higher than a permissible level, it needs to be reduced. That is, according to the seventh embodiment shown in FIG. 10A, the diameter of the inner peripheral face of the elastic body 29 is made larger than that of the first embodiment. When the fuel pressure in the fuel storage space 19 is higher than the permissible level, if the gaseous fuel that has leaked out from a gap between the outer peripheral front end face 27 of the valve body 11 and the rear end face of the injection nozzle 17 acts to deform the elastic body 29 inwards in the radial direction of the valve body 11, the entire elastic body 29 is deformed and moved inwards in the radial direction of the valve body 11 as shown in FIG. 10B. Due to this deformation and radially inward movement of the entire elastic body 29, the fuel pressure in the fuel storage space 19 is reduced. It is to be noted herein that the elastic body in the seventh embodiment corresponds to pressure release means.

While the present invention has been described with reference to what are presently considered to be preferred embodiments thereof, it is to be understood that the present invention is not limited to the disclosed embodiments or construction. On the contrary, the present invention is intended to cover various modifications and equivalent arrangements. In addition, while the various elements of the disclosed invention are shown in various exemplary combinations and configurations, other combinations and configurations, including more, less or only a single embodiment, are also within the spirit and scope of the present invention. For example, the invention can also be practiced with the elastic body 29 being provided on the rear end face of the injection nozzle 17 rather than on the front end face of the valve body 11. This alternative embodiment would still result in the injection nozzle 17 and valve body 11 abutting after first contacting the elastic body 29.

What is claimed is:

1. A fuel injection valve, comprising:
an injection nozzle provided with an injection hole for gaseous fuel injection;
a valve body that closes the injection hole; and
an elastic body provided on one of a wall surface of the injection nozzle and a wall surface of the valve body, wherein the elastic body is provided such that when the body closes the injection hole, the wall surface of the valve body comes into abutment with the wall surface of the injection nozzle after the valve body has come into abutment with the injection nozzle through the elastic body, and a seal surface against gaseous fuel is formed by contact between the wall surface of the injection nozzle and the wall surface of the valve body; and
a maximum surface roughness of the wall surface of the valve body and the wall surface of the injection nozzle, which abut each other, is substantially equal to or smaller than 4 μm to form a seal against the gaseous fuel by contact between the wall surfaces.

2. The fuel injection valve according to claim 1, wherein
the elastic body has an annular shape and is disposed in an annular recess portion provided in the one wall surface, and
the elastic body has an inner peripheral face that is greater in inner diameter than the annular recess portion.

3. The fuel injection valve according to claim 1, wherein
a maximal surface roughness value of each of the wall surfaces of the valve body and the injection nozzle, which abut each other, is substantially equal to or smaller than 2 μm.

4. The fuel injection valve according to claim 1, wherein
the elastic body is provided with a protruding portion that protrudes toward the other of the wall surface of the injection nozzle and the wall surface of the valve body.

5. The fuel injection valve according to claim 4, wherein
the elastic body has an annular shape, and
the protruding portion is provided radially inwardly of a radially central portion of the elastic body.

6. The fuel injection valve according to claim 4, wherein
the elastic body has an annular shape, and
the elastic body has a face that is located radially outwardly of the protruding portion and is recessed in a direction away from the other of the wall surface of the injection nozzle and the wall surface of the valve body.

7. The fuel injection valve according to claim 1, wherein
elastic body has an annular shape and is disposed in an annular recess portion provided in one of the wall surface of the injection nozzle and the wall surface of the valve body, and
the elastic body has an outer peripheral surface that is smaller in outer diameter than the annular recess portion.

8. The fuel injection valve according to claim 1, wherein
the elastic body has an annular shape and is disposed in an annular recess portion provided in one of the wall surface of the injection nozzle and the wall surface of the valve body, and
the recess portion has a bottom face that is inclined such that the recess portion becomes shallower radially inwards.

9. The fuel injection valve according to claim 1, wherein
the other of the wall surface of the injection nozzle and the wall surface of the valve body, on which the elastic body abuts, is inclined radially inward to approach the elastic body.

10. A method of manufacturing a fuel injection valve that includes an injection nozzle provided with an injection hole for gaseous fuel injection, a valve body for closing the injection hole, and an elastic body provided on one of a wall surface of the injection nozzle and a wall surface of the valve body, wherein the elastic body is provided such that when the valve body closes the injection hole, the wall surface of the valve body comes into abutment with the wall surface of the injection nozzle after the valve body has come into abutment with the injection nozzle through the elastic body, and a seal surface against gaseous fuel is formed by contact between the wall surface of the injection nozzle and the wall surface of the valve body, comprising the step of:

causing the wall surface of the valve body and the wall surface of the injection nozzle, which abut on each other, to slidably contact each other so as to reduce a surface roughness value of the seal surface until a maximal surface roughness value of the wall surface of the valve body and a maximum surface roughness of the wall surface of the injection nozzle have a combined sum that is substantially equal to or less than 4 $\mu$m to form a seal against gaseous fuel.

11. The method according to claim 10, wherein the slidable contact is achieved by rotating the wall surface of the valve body relative to the wall surface of the injection nozzle while the wall surfaces abut each other.

12. The method according to claim 10, wherein the slidable contact is continued until each maximal surface roughness value is substantially equal to or less than 2 $\mu$m.

* * * * *